United States Patent [19]
Tebo

[15] 3,690,202
[45] Sept. 12, 1972

[54] SENSOR CONTROL FOR TOOL BREAKAGE

[72] Inventor: Walter J. Tebo, Chicopee Falls, Mass.

[73] Assignee: Emhart Corporation, Bloomfield, Conn.

[22] Filed: March 15, 1971

[21] Appl. No.: 124,119

[52] U.S. Cl. .......................... 82/34 A, 29/95, 408/5.2
[51] Int. Cl. ............................. B23b 3/38, B26d 1/00
[58] Field of Search .......... 82/34, 34 A; 408/5.2, 5, 6; 29/95, 96

[56] References Cited

UNITED STATES PATENTS

| 2,329,541 | 9/1943 | Kuehni | 82/34 X |
| 2,488,696 | 11/1949 | Waldron | 82/34 A X |
| 3,079,821 | 3/1963 | Von Zelewsky | 82/34 X |
| 3,301,100 | 1/1967 | Hubeny | 408/6 |
| 3,554,064 | 1/1971 | Skillen | 82/34 A |

Primary Examiner—Harrison L. Hinson
Attorney—Chapin, Neal and Dempsey

[57] ABSTRACT

Mechanical sensor for stopping the operation of a cutting tool in the event of tool bit breakage, in which a pivotable tip is carried by a tool holder with its lower extremity adjacent the tip of the cutting bit. A spring releasably urges the pivotable tip in a given direction, and a rod carried by the holder with one end thereof engaged with the tip and movable in response to pivotable movement thereof. A spring urging said rod into engagement with the tip, the opposite end of the rod being positioned to actuate a switch to cut off the power to said cutting tool.

3 Claims, 4 Drawing Figures

PATENTED SEP 12 1972 3,690,202
SHEET 1 OF 2
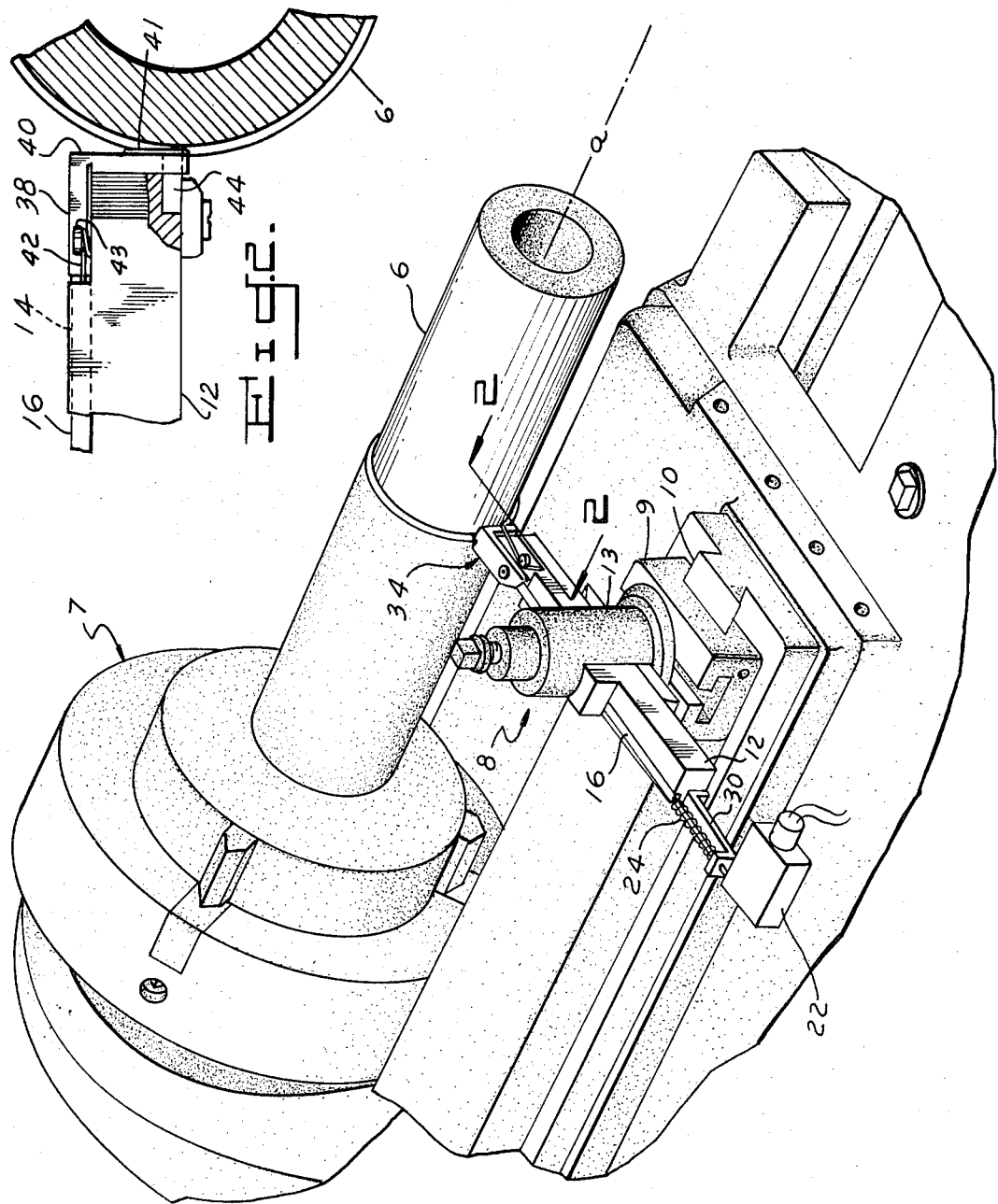
INVENTOR.
Walter J. Tebo
BY Chapin, Neal & Dempsey
Attorneys

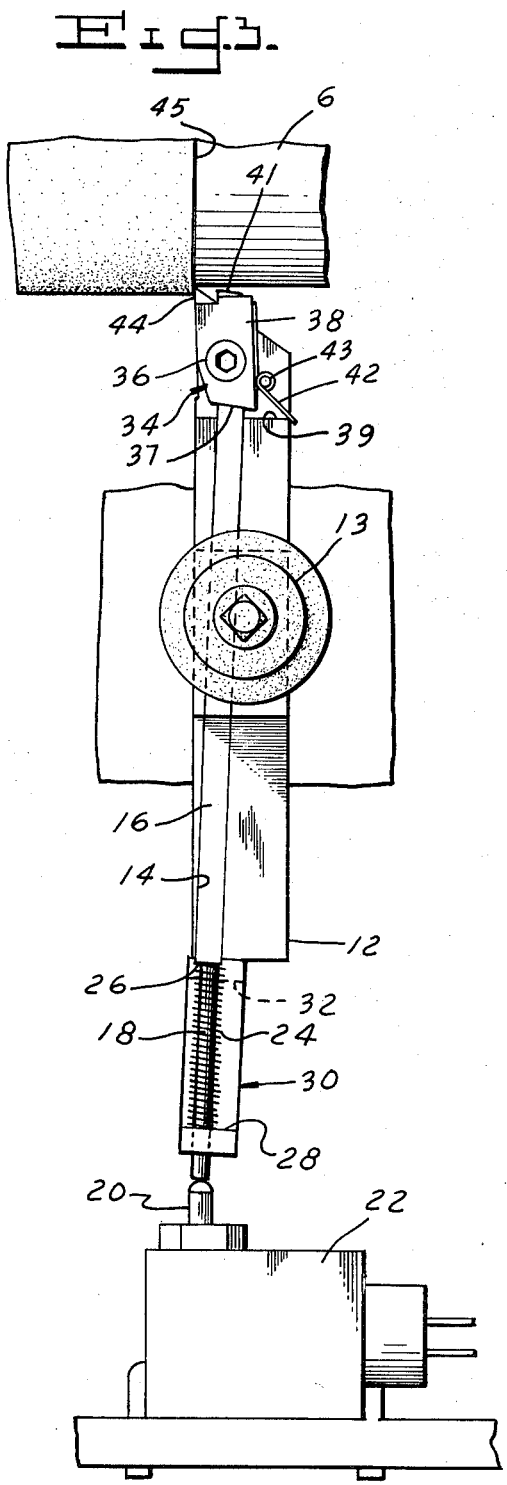
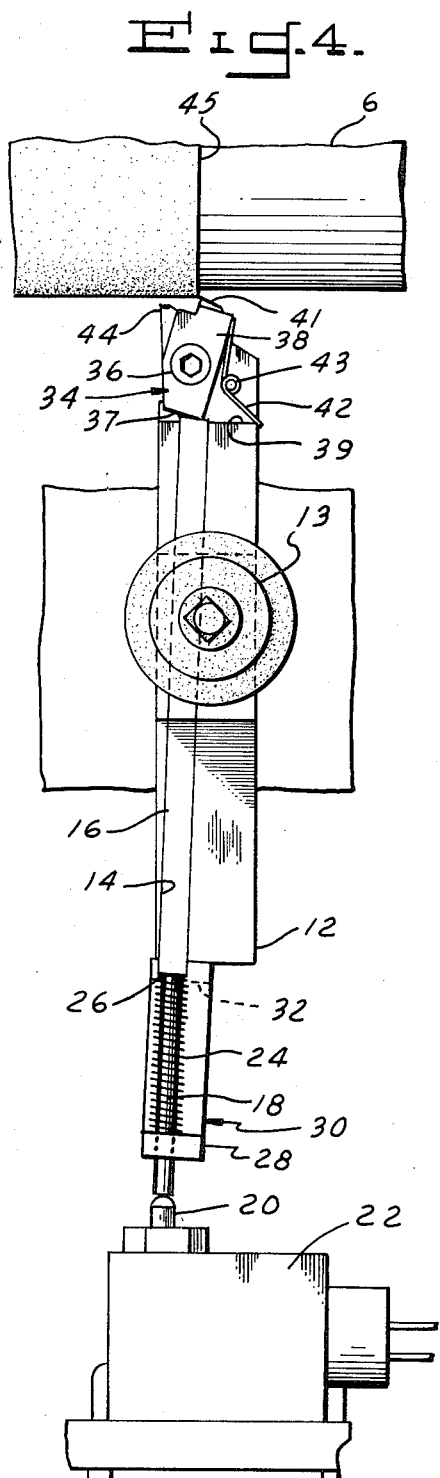
INVENTOR.
Walter J. Tebo
BY Chapin, Neal & Dempsey
attorneys

SENSOR CONTROL FOR TOOL BREAKAGE

BACKGROUND

In the operation of cutting tools, breakage of the cutting tip may occur from time to time and if the tool breakage is not detected and the machine continues to operate, the tool holder may be brought into contact with the workpiece with resulting damage to the workpiece, the tool holder and the work holder. While various devices have been proposed to detect the breakage of a cutting tool or its cutting tip, in general, these have tended to be complex in construction and operation, and in many cases have utilized electrical components which provide an electrical signal when tool breakage is detected.

The principal object of this invention is to provide a reliable mechanical sensor for tool breakage which is simple in construction and readily adaptable for application to existing cutting tools.

The above and other objects of this invention will be more readily apparent from the accompanying description and with reference to the accompanying drawings, in which FIG. 1 is a perspective view of a tool holder embodying this invention;

FIG. 2 is a cross section on an enlarged scale, taken along line 2—2 of FIG. 1; and FIGS. 3 and 4 are top plan views on an enlarged scale of the tool holder of FIG. 1 shown in different operative conditions.

Referring in detail to the drawings, in FIG. 1 is shown a workpiece 6 rotatable about its longitudinal axis *a* by any suitable means, such as a lathe 7. As illustrated, the workpiece is being machined to a desired size and configuration by means of a cutting tool, shown generally at 8. The tool is axially movable with a carriage 9 along a suitable guideway, such as the upstanding dovetailed rib 10.

In general, the tool comprises a bar 12 which as shown is of generally rectangular cross section clamped by a tool holder 13 which extends upwardly from a T-shaped slot formed in the carriage 9. A longitudinally extending recess or slot 14 is formed in the bar 12 for accommodating the sliding movement therein of a rod 16. As illustrated, the rod is generally rectangular in cross section and slidingly disposed in the slot 14, and it also includes a generally cylindrical outer end portion 18. The outer end surface of the cylindrical portion of the rod 16 is engaged with an actuator button 20 of an "ON-OFF" switch mechanism 22.

The bar 16 is urged inwardly, toward the workpiece 6 by means of a coil spring 24 telescoped over the cylindrical end portion 18 of the rod. At one end thereof, the spring is seated against a shoulder 26 formed by the junction of the rectangular and cylindrical portion of the rod. At its other end the rod is seated against the inner surface of a flange portion 28 of a bracket 30. The bracket 30 also includes a horizontal portion extending generally parallel to and in spaced relation with the coil spring 24 and a downwardly extending flange 32 which is secured to the outer end surface of the bar 12 by any suitable means, not shown.

At its inner end the rod 16 is engaged with a deflector-link or sensor 34 pivotally affixed adjacent the inner end of the bar by means of a pivot pin 36. As shown at 37, the surface of the sensor engaged by the rod 16 is slightly beveled so that the rotational pivotable movement of the sensor is readily transmitted into rectilinear movement of the rod. The sensor includes a shank portion 38 fitted in a recess 39 which in the embodiment shown is formed in the upper surface adjacent the end of the bar. The shank portion is generally parallel with the upper surface of the recess 39. The sensor further includes a transverse portion which extends generally across the thickness or height of the bar 12. A carbide wear tip 41 may be provided on the outer surface of the transverse portion of the sensor. Spring 42 includes a central loop portion, fitted in an upstanding pin 43, and oppositely extending leg portions, one engaged with a shoulder formed by the recess 39 and the other engaged with the shank portion of the sensor urging the sensor in a direction such that its tip 41 is adjacent cutting tip 44 carried on the opposite side of the bar 12, as best shown in FIG. 2. The cutting tool bit 44 may be of any suitable type removably secured to the bar 12, such that its outer cutting edge, as shown in FIG. 3, extends beyond the outer end portion of the sensor tip 41.

As best shown in FIG. 4, when the tool is being used under normal conditions, i.e., when there is no cutting tip impairment, the cutting tip 44 is engaged with the workpiece 6 and the sensor tip 41 is clear of contact with the workpiece. The spring 42 urges the sensor in a clockwise direction as viewed in FIG. 3, and the coil spring 24 urges the rod 16 into engagement with the outer surface of the shank portion of the sensor. In the event the cutting tip 44 is broken during the cutting operation, as shown in FIG. 4, continued axial movement of the tool holder carries the sensor tip 41 into engagement with the unfinished edge 45 of the workpiece 6. When this occurs, the sensor is pivoted, tensioning spring 42, moving the rod 16 outwardly with simultaneous compression of spring 24 so that the outer end of the rod 16 actuates the button 20 of the microswitch 22. The microswitch is electrically connected into the "ON-OFF" circuit of the equipment, so that when depressed in the manner described, the machine is immediately stopped. In addition, a warning light or audible alarm may be connected to attract an operator's attention when the switch is actuated. Thereafter, the operator can replace the cutting tip 44, reposition the tool and restart the machine.

Although operation of the sensor embodying this invention has been described for illustrative purposes in conjunction with external milling or turning, it will be appreciated by those skilled in the art that this invention is equally applicable to internal cutting operations.

Having thus described this invention, what is claimed is:

1. Mechanical sensor for arresting the operation of a cutting tool in the event of tool bit breakage comprising an electrical switch element in circuit with the "ON-OFF" switch of said cutting tool, a tool bar having a cutting tool bit mounted adjacent one end thereof, a detector pivotably disposed adjacent said one end, means releasably urging said detector to one position in which a portion thereof is disposed in adjacent trailing relationship to the tool bit when cutting a workpiece, a rod slidably carried by said bar with one end engaged with said detector and movable linearly by pivotable movement of said detector from said one position, the other end of said bar being disposed to actuate said switch to its "OFF" condition in response to pivotable movement of said detector from said one position.

2. Mechanical sensor as set forth in claim 1 in which said detector includes a laterally extending portion disposed radially inwardly and in trailing relation to said tool bit and in which spring means urges said detector to said one position.

3. Mechanical sensor as set forth in claim 1 in which said detector includes a shank portion pivotably mounted on a surface of said tool bar opposite the mounting of said tool bit, and a portion extending in laterally spaced relation to the end of said bar, said laterally extending portion being disposed in adjacent trailing relation to said tool bit when the latter is in cutting a workpiece, said detector being pivotable through a substantial angle from said one position, said bar including a groove slidingly accommodating said rod, one end of the rod being engaged with the shank portion of the detector and the other end being disposed for engagement with said electrical switch.

* * * * *